United States Patent
Fukui et al.

(10) Patent No.: US 7,552,362 B2
(45) Date of Patent: Jun. 23, 2009

(54) BRIDGE, ERROR NOTIFICATION METHOD THEREFOR AND SYSTEM

(75) Inventors: Akitomo Fukui, Yokohama (JP); Shunichi Fujise, Abiko (JP)

(73) Assignee: Canon Kabushiki Kaisha

( * ) Notice: Subject to any disclaimer, the term of this patent is extended or adjusted under 35 U.S.C. 154(b) by 342 days.

(21) Appl. No.: 11/466,816

(22) Filed: Aug. 24, 2006

(65) Prior Publication Data

US 2007/0073957 A1   Mar. 29, 2007

(30) Foreign Application Priority Data

Aug. 26, 2005   (JP)   ............... 2005-246430

(51) Int. Cl.
*G06F 11/00* (2006.01)

(52) U.S. Cl. ............... 714/44; 714/5; 714/43; 714/56; 710/306

(58) Field of Classification Search .......... 714/5, 714/9, 10, 23, 43, 44, 46, 55, 56; 710/306, 710/311

See application file for complete search history.

(56) References Cited

U.S. PATENT DOCUMENTS

| | | | |
|---|---|---|---|
| 6,523,140 B1 * | 2/2003 | Arndt et al. | 714/44 |
| 6,530,043 B1 * | 3/2003 | Beardsley et al. | 714/43 |
| 6,557,121 B1 * | 4/2003 | McLaughlin et al. | 714/43 |
| 7,406,634 B2 * | 7/2008 | Kumar | 714/23 |
| 2004/0205393 A1 * | 10/2004 | Kitamorn et al. | 714/20 |
| 2008/0082866 A1 * | 4/2008 | Li | 714/43 |
| 2008/0148104 A1 * | 6/2008 | Brinkman et al. | 714/43 |

FOREIGN PATENT DOCUMENTS

JP   07-210471   8/1995

* cited by examiner

*Primary Examiner*—Robert Beausoliel
*Assistant Examiner*—Joseph D Manoskey
(74) *Attorney, Agent, or Firm*—Cowan, Liebowitz & Latman, P.C.

(57) ABSTRACT

In a bridge which connects between an expansion bus of a primary system and that of a secondary system, a local error such as an expansion bus error and CPU hang-up which occurs in the secondary system is recognized. The primary system is notified of the local error as a system error.

4 Claims, 5 Drawing Sheets

BRIDGE, ERROR NOTIFICATION METHOD THEREFOR AND SYSTEM

BACKGROUND OF THE INVENTION

1. Field of the Invention

The present invention relates to a bridge which connects between an expansion bus of a primary system and that of a secondary system, an error notification method for the bridge and a system.

2. Description of the Related Art

In an apparatus such as a multifunctional peripheral, copying machine, and printer, an expansion card is connected to an expansion I/F for expanding the functions of the apparatus. When a function which is not provided for the main body is added, it is often the case that the expansion I/F comprises a PCI bus or I/F corresponding to PCI. This facilitates choice of a functional device by using a PCI bus and I/F corresponding to PCI. A function which is not provided for the above-described main body includes, for example, a network function, wireless LAN function, and USB HUB function.

A method in which a function of recognizing a bus error is provided on the bridge device side, and an error notification can be performed when communication between an expansion card and main body is not established, has been conventionally proposed for notification of errors in a system using the above-described I/F (e.g., see Japanese Patent Laid-Open No. 7-210471).

In such a prior art, however, an error of a CPU local bus of an expansion card existing on the rear stage of a PCI bus on the expansion card side cannot be notified.

For this reason, time-out processing has to be used on the main body side for such local errors and a long time is taken to perform error processing after the occurrence of the error.

SUMMARY OF THE INVENTION

It is an object of the present invention to reduce the time from the occurrence of a local error of a secondary system to error processing in a primary system.

It is another object of the present invention to provide a bridge which connects between an expansion bus of a primary system and that of a secondary system, comprising recognition means for recognizing a local error which occurs in the secondary system, and notification means for notifying the primary system of the local error recognized by the recognition means as a system error.

It is still another object of the present invention to provide an error notification method of a bridge which connects between an expansion bus of a primary system and that of a secondary system, comprising a recognition step of recognizing a local error which occurs in the secondary system, and a notification step of notifying the primary system of the local error recognized in the recognition step as a system error.

It is still another object of the present invention to provide a system including a primary system and a secondary system, wherein the secondary system comprises bridge means for connecting the primary system, the bridge means having notification means for notifying the primary system of a system error in response to occurrence of a local error in the secondary system and holding means for holding information representing the local error, and wherein the primary system resets the secondary system in accordance with the system error notification from the bridge means and the information representing the local error which is held in the holding means.

It is still another object of the present invention to provide a system including a primary system and a secondary system, wherein the secondary system comprises bridge means for connecting the primary system, the bridge means having notification means for notifying the primary system of an interrupting signal in response to occurrence of a local error in the secondary system and holding means for holding information representing the local error, and wherein the primary system resets the secondary system in accordance with the interrupting signal notification from the bridge means and the information representing the local error which is held in the holding means.

Further features of the present invention will become apparent from the following description of exemplary embodiments (with reference to the attached drawings).

DESCRIPTION OF THE EMBODIMENTS

The best mode for carrying out the present invention will be described in detail below with reference to the accompanying drawings.

First Embodiment

Figure 1:
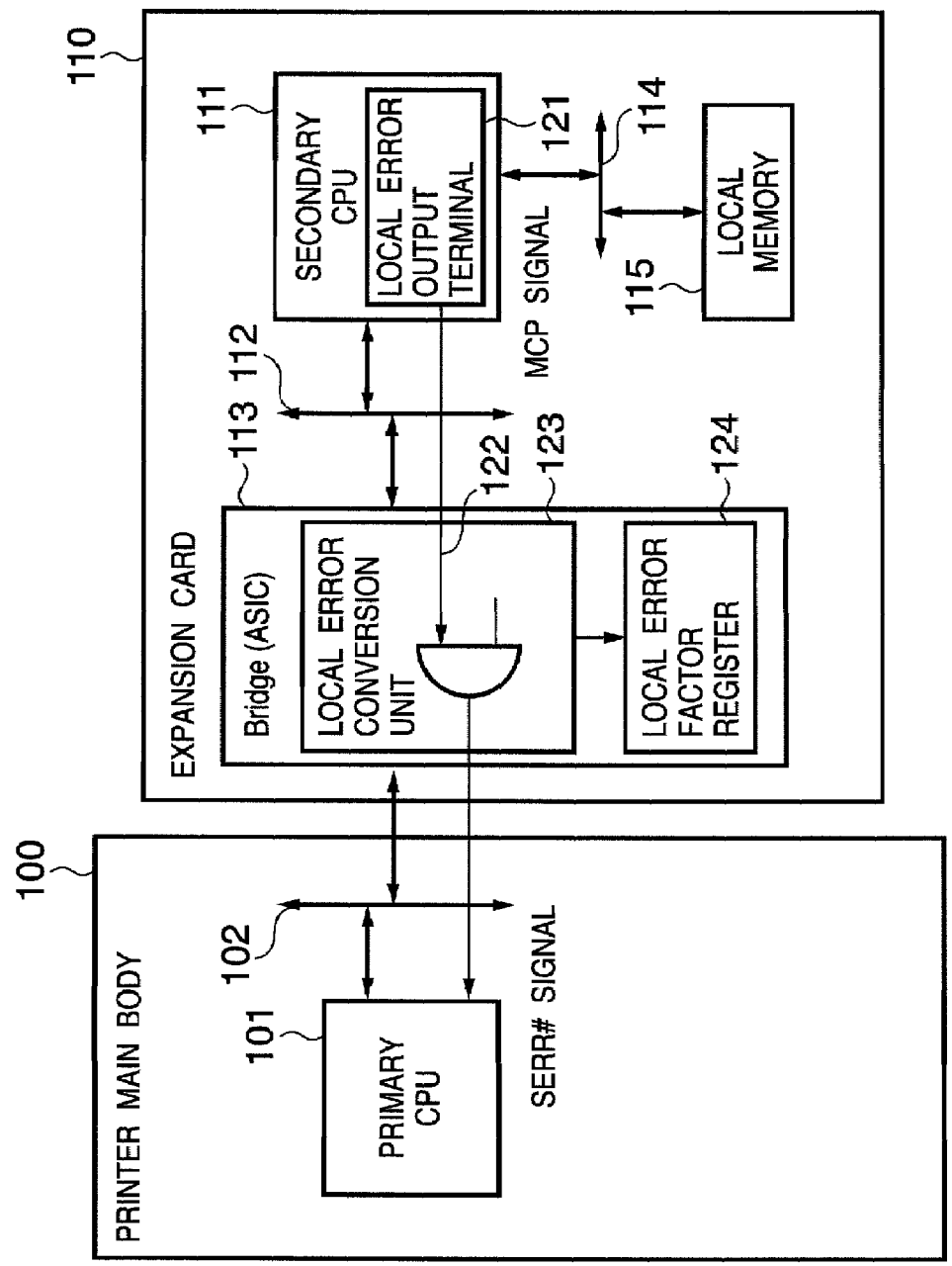
FIG. 1 is a block diagram showing an example of the configuration of a system using a bridge in the first embodiment.

FIG. 1 is a block diagram showing an example of the configuration of a system using a bridge in the first embodiment. Referring to FIG. 1, reference numeral 100 denotes a printer main body as an example of an apparatus implementing the present invention, which comprises an expansion bus such as a PCI bus and to which an expansion card (to be described later) can be connected. Note that the present invention is not limited to a printer. A function such as a network function, wireless LAN function, and USB HUB function which is not provided for the printer main body 100 can be added to the printer main body 100 by using the expansion card. Reference numeral 101 denotes a primary CPU which controls the overall printer main body 100 in accordance with a program stored in a ROM (not shown). Reference numeral 102 denotes a primary PCI bus as an expansion bus, which provides an interface (I/F) corresponding to a PCI bus.

Reference numeral 110 denotes an expansion card which is connected to the expansion bus 102 of the printer main body 100 and provides a predetermined function for the printer main body 100. In the expansion card 110, reference numeral 111 denotes a secondary CPU which controls the overall expansion card 110 in accordance with a program stored in a ROM (not shown). The secondary CPU 111 includes a local error output terminal 121, and asserts an MCP signal when a local error (e.g., a secondary PCI bus error and secondary CPU hang-up) occurs on the expansion card 110 side. Note that the MCP signal may be high or low. In this case, a low signal is output.

Reference numeral 112 denotes a secondary PCI bus as an expansion bus of the expansion card 110, which connects between a bridge 113 (to be described later) and the secondary CPU 111. The bridge 113 comprises, e.g., an ASIC, and is connected to the expansion bus 102 of the printer main body 100, thereby implementing communication between the printer main body 100 and expansion card 110. Reference numeral 114 denotes a local bus which connects between a local memory 115 (to be described later) and the secondary CPU 111. The local memory 115 consists of a RAM or ROM which can store and output data under the control of the secondary CPU 111.

In the above-described bridge 113, reference numeral 122 denotes a local error input unit to which a local error output signal (MCP signal) output from the secondary CPU 111 is input. Reference numeral 123 denotes a local error conversion unit which converts the input local error output signal into an SERR# signal (system error signal) to notify the printer main body 100 of it. The local error conversion unit 123 notifies a local error factor register 124 (to be described later) of the local error signal. The local error factor register 124 activates factor bits of the register in accordance with the notified local error signal. An error factor can be determined by the local error factor register 124. If an error code is displayed on, e.g., a display (not shown), an operator can address the error and quickly get on to failure analysis.

Local error processing which is performed when a local error actually occurs in the expansion card 110 will be described using FIG. 2.

Figure 2:
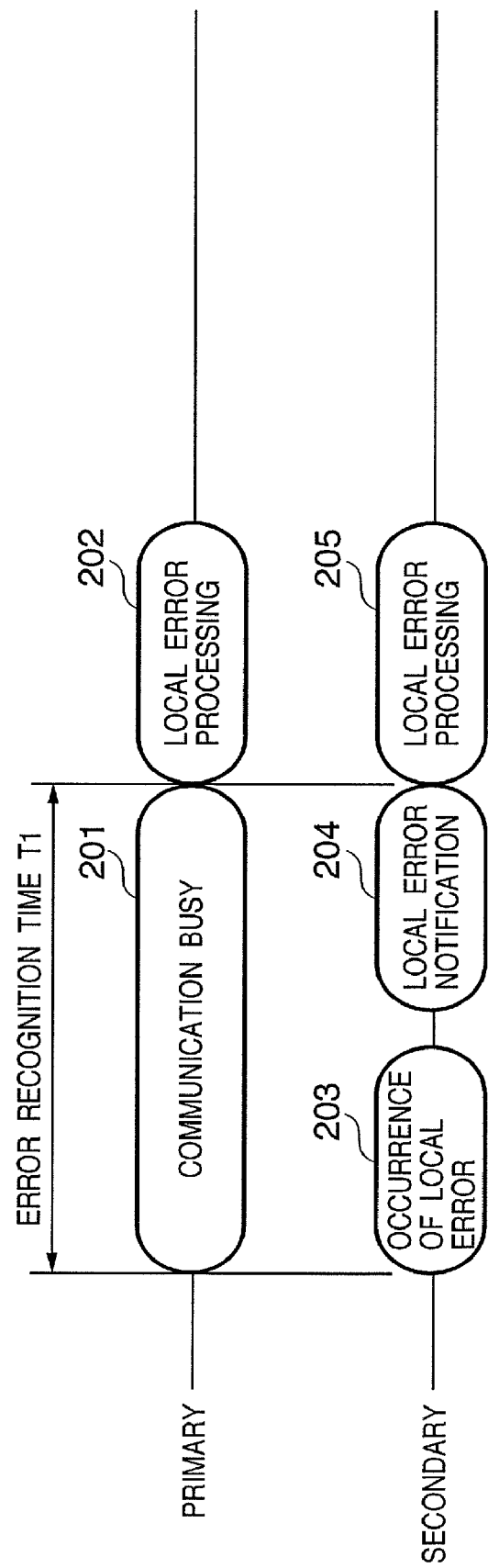
FIG. 2 is a view showing local error processing according to the first embodiment.

FIG. 2 is a view showing local error processing according to the first embodiment.

As shown in FIG. 2, the printer main body 100 (primary) and expansion card 110 (secondary) communicate with each other. In this case, when an error occurs in the local bus 114 of the expansion card 110 (203), the communication state between the expansion bus 102 of the printer main body 100 and the expansion bus 112 of the expansion card 110 is busy due to the error (201).

Upon occurrence of the error in the local bus 114, local error notification processing is performed in the expansion card 110 (204). Details of the local error notification processing are as follows.

The secondary CPU 111 of the expansion card 110 drives the local error output terminal 121 low and asserts a local error output signal upon occurrence of a local error. The local error input unit 122 of the bridge 113 recognizes that the local error output signal is asserted, and the local error conversion unit 123 of the bridge 113 asserts an SERR# signal based on PCI standards. On the other hand, when the primary CPU 101 recognizes that the SERR# signal is asserted, an SERR# factor (the local error factor register 124) of the bridge 113 is confirmed. In this case, the primary CPU 101 resets the secondary CPU lll as local error processing (202), since the SERR# factor indicates a local error. By this reset, the expansion card 110 (secondary) returns to the initial state and communication is restarted (205).

In this way, in the local error processing according to the first embodiment, the primary CPU 101 can perform error processing immediately without waiting until timeout even in the case of a local error of the expansion card 110, and thus the downtime of the main body is reduced. Furthermore, an error factor can be determined. Therefore, if an error code is displayed, an operator can address the error and quickly get on to failure analysis.

Second Embodiment

The second embodiment according to the present invention will now be described in detail with reference to the accompanying drawings. In the second embodiment, a register for setting whether to perform a local error notification is provided in addition to the configuration described in the first embodiment.

Figure 3:
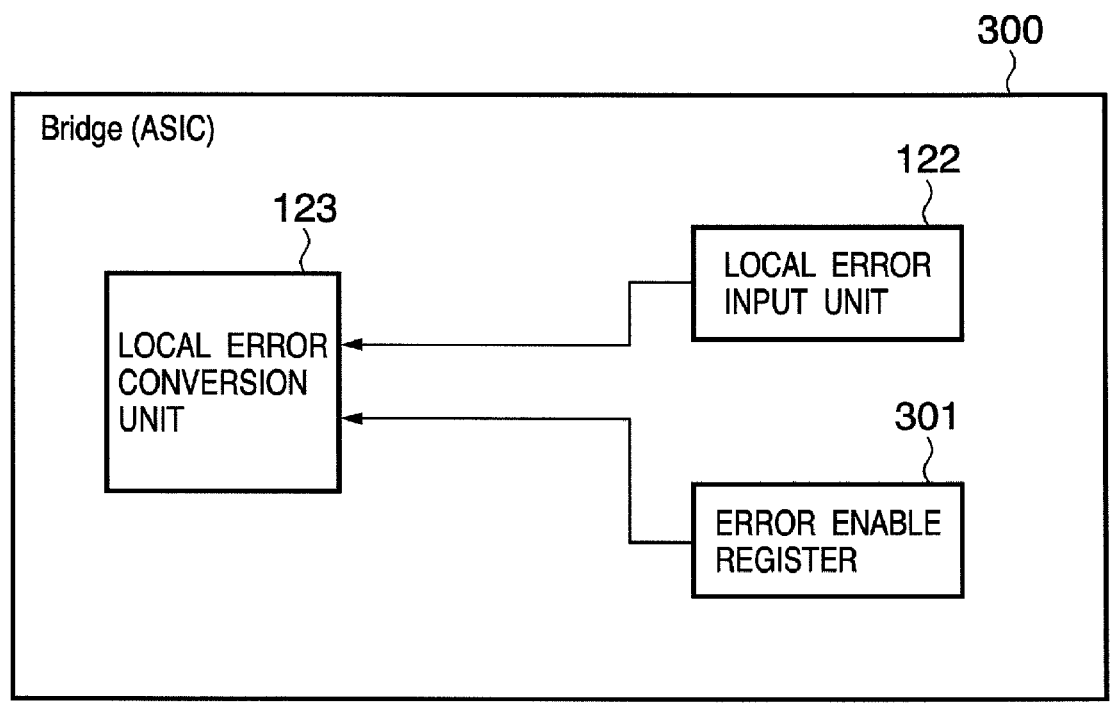
FIG. 3 is a block diagram showing an example of the configuration of a bridge 300 in the second embodiment.

FIG. 3 is a block diagram showing an example of the configuration of a bridge 300 in the second embodiment. Referring to FIG. 3, the bridge 300 includes an error enable register 301. With the error enable register 301, a local error notification is output to the primary CPU 101 only when the error enable register 301 is enabled. The bridge 300 is used instead of the bridge 113 in FIG. 1.

Note that the operation of the expansion card 110 is the same as that in the first embodiment except that the local error conversion unit 123 performs a local error notification only when the error enable register 301 is enabled.

The error enable register 301 is controlled by the secondary CPU 111 and can pass, to the local error conversion unit 123, information representing whether the error enable register 301 is enabled. If the error enable register 301 is enabled, the operation is the same as that in the first embodiment. If the error enable register 301 is disabled, a local error is not notified.

According to the second embodiment, the same expansion card can be used for both a conventional main body and new main body without changing the hardware by performing a conventional operation upon disabling the error enable register 301 if the main body is a product which does not support a local error, and by performing an operation upon enabling the error enable register 301 if the main body is a product which supports a local error.

Third Embodiment

The third embodiment according to the present invention will now be described in detail with reference to the accompanying drawings. In the third embodiment, occurrence of a local error is recognized by a watchdog timer.

Figure 4:
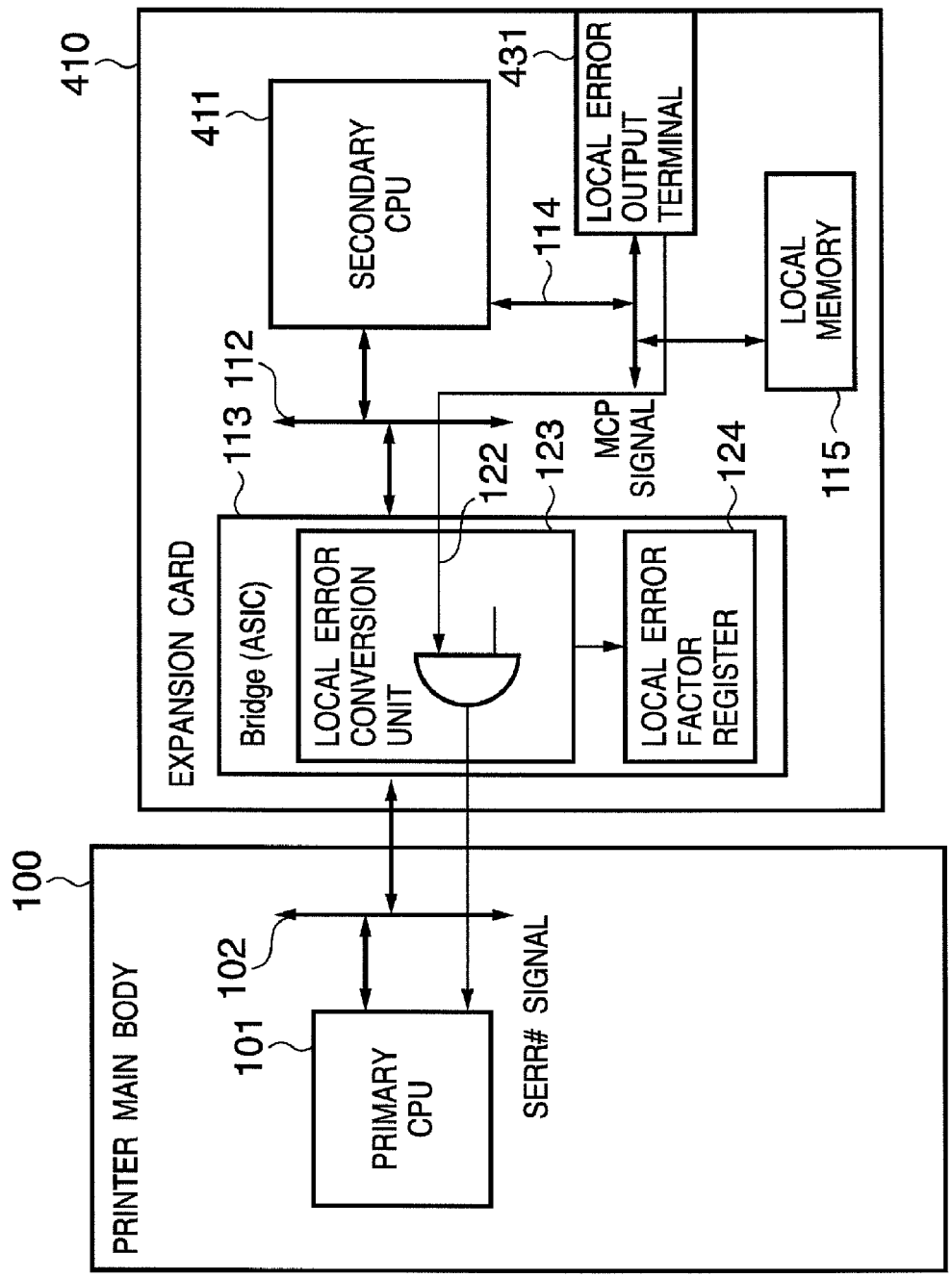
FIG. 4 is a block diagram showing an example of the configuration of a system using a bridge in the third embodiment.

FIG. 4 is a block diagram showing an example of the configuration of a system using a bridge in the third embodiment. The local error output terminal 121 is provided within the secondary CPU 111 of the expansion card 110 in the first embodiment shown in FIG. 1, but in the third embodiment, a local error output unit is provided external to a secondary CPU 411. The printer main body 100 and other components within an expansion card 410 are the same as those in the first embodiment. Accordingly, a difference from the first embodiment will be explained.

In FIG. 4, reference numeral 431 denotes a local error output unit which functions as a watchdog timer and is connected to the local bus 114. The secondary CPU 411 periodically performs a write operation so that the local error output unit 431 functioning as a watchdog timer monitors that the secondary CPU 411 does not hang up.

In the configuration shown in FIG. 4, when a local error occurs, the secondary CPU 411 may hang up. In the third embodiment, however, the local error output unit 431 recognizes the local error and notifies the bridge 113 of it. Therefore, the bridge 113 can notify the printer main body 100 of the occurrence of the local error.

As described above, the operation in the third embodiment is the same as that in the first embodiment except that the local error output unit (watchdog timer) 431 issues an event of a local error notification.

According to the third embodiment, error processing can be performed immediately without waiting until timeout and thus the downtime of the main body is reduced, similarly to the first embodiment.

Fourth Embodiment

The fourth embodiment according to the present invention will now be described in detail with reference to the accompanying drawings. In the first to third embodiments, an SERR# signal is used for a notification of occurrence of a local error in an expansion card. In the fourth embodiment, however, an interrupt signal (INTA# signal) is used for the notification.

Figure 5:
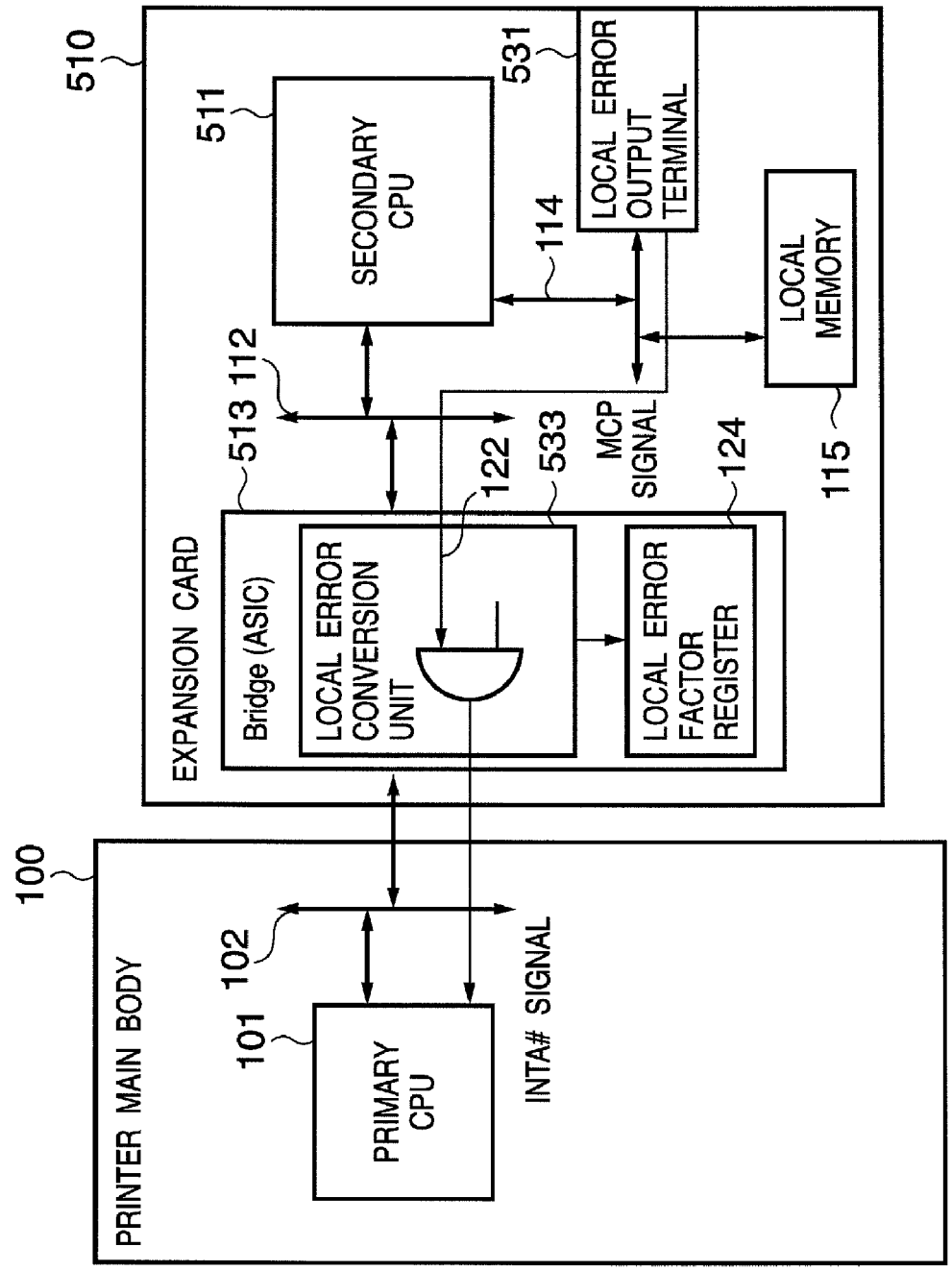
FIG. 5 is a block diagram showing an example of the configuration of a system using a bridge in the fourth embodiment.

FIG. 5 is a block diagram showing an example of the configuration of a system using a bridge in the fourth embodiment. In a bridge 513, reference numeral 533 denotes a local error conversion unit which converts a local error output signal input to the local error input unit 122 into an INTA# signal and notifies the printer main body 100 of it.

As described above, the operation in the fourth embodiment is the same as that in the third embodiment except that an INTA# signal from the local error conversion unit 533 is used for an event of a local error notification.

According to the fourth embodiment, the downtime of the printer main body 100 can be reduced by notifying the primary CPU 101 of the printer main body 100 of the occurrence of a local error in an expansion card 510 by an interrupt signal.

Note that in the fourth embodiment, a local error output unit 531 connected to the local bus 114 is used similarly to the third embodiment. However, the local error output terminal 121 may be used similarly to the first embodiment.

The error enable register 301 in the second embodiment may also be applied to the third or fourth embodiment.

Note that the present invention may be applied to a system including a plurality of devices (e.g., a host computer, interface device, reader, and printer) or an apparatus (e.g., a copying machine or facsimile apparatus) formed by a single device.

When a recording medium which records software program codes for implementing the functions of the above-described embodiments is supplied to a system or apparatus, the computer (or the CPU or MPU) of the system or apparatus reads out and executes the program codes stored in the recording medium. With this operation, the object of the present invention is also achieved.

In this case, the program codes read out from the recording medium implement the functions of the above-described embodiments, and the recording medium which stores the program codes constitutes the present invention.

The recording medium for supplying the program codes includes a hard disk, optical disk, magnetooptical disk, CD-ROM, CD-R, magnetic tape, nonvolatile memory card, and ROM.

The functions of the above-described embodiments are implemented when the computer executes the readout program codes and in the following case. That is, when an OS (Operating System) or the like running on the computer performs some or all of actual processes on the basis of the instructions of the program codes, the functions of the above-described embodiments are implemented.

Furthermore, the present invention includes a case in which, after the program codes read out from the recording medium are written in the memory of a function expansion board inserted into the computer or the memory of a function expansion unit connected to the computer, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-246430, filed Aug. 26, 2005, which is hereby incorporated by reference herein in its entirety.

What is claimed is:

1. A system including a primary system and a secondary system,
    wherein said primary system comprises a primary CPU and a primary PCI bus,
    said secondary system comprises a secondary CPU, a bridge for connecting said primary PCI bus, a local error output unit, a secondary PCI bus connected to said bridge and said secondary CPU, and a local bus,
    said secondary CPU is connected to said local error output unit via said local bus and accesses said local error output unit periodically, and said local error output unit is connected to said local bus and outputs a local error output signal to said bridge when said secondary CPU hangs up,
    said bridge having notification means for notifying said primary CPU of a system error in response to the local error output signal from said local error output unit and holding means for holding information representing a cause of the system error in response to the local error output signal from said local error output unit, and
    wherein said primary CPU resets said secondary CPU in accordance with the system error notification from said bridge and the information representing the cause of the system error which is held in said holding means.

2. The system according to claim 1, further comprising display means for displaying in accordance with the information representing the cause of the system error held in said holding means.

3. A system including a primary system and a secondary system,
    wherein said primary system comprises a primary CPU and a primary PCI bus,
    said secondary system comprises a secondary CPU, a bridge for connecting said primary PCI bus, a local error output unit, a secondary PCI bus connected to said bridge and said secondary CPU, and a local bus,
    said secondary CPU is connected to said local error output unit via said local bus and accesses said local error output unit periodically, and said local error output unit is connected to said local bus and outputs a local error output signal to said bridge when said secondary CPU hangs up,
    said bridge having notification means for notifying said primary CPU of an interrupting signal in response to occurrence of a local error in said secondary CPU and holding means for holding information representing the cause of a system error in response to the local error output signal from said local error output unit, and
    wherein said primary CPU resets said secondary CPU in accordance with the interrupting signal notification from said bridge and the information representing the cause of the system error which is held in said holding means.

4. The system according to claim 3, further comprising display means for displaying in accordance with the information representing the cause of the system error held in said holding means.

* * * * *